Oct. 4, 1949. B. W. BENBOW 2,483,613
DRILL PRESS
Filed July 15, 1947
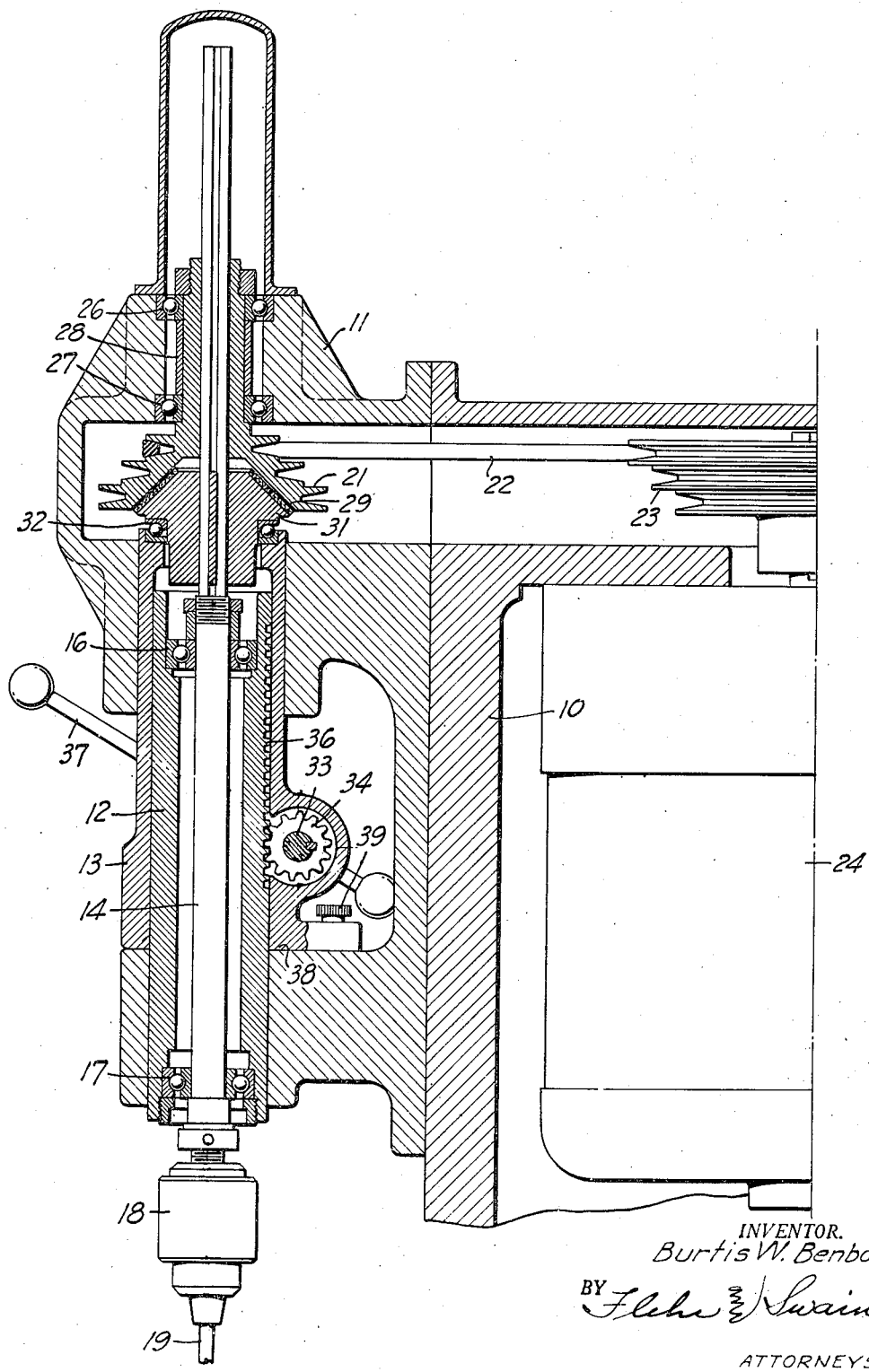
INVENTOR.
Burtis W. Benbow
BY Fleher & Swain
ATTORNEYS Patented Oct. 4, 1949

2,483,613

UNITED STATES PATENT OFFICE 2,483,613

DRILL PRESS

Burtis W. Benbow, Benbow, Calif.

Application July 15, 1947, Serial No. 760,963

2 Claims. (Cl. 77—29)

This invention relates generally to drilling apparatus and particularly to machines commonly known as drill presses.

The usual type of drill press makes use of a spindle which carries a drill chuck and which is journaled to a supporting frame. Feed means is provided whereby the spindle can be retracted or advanced with respect to the work. A suitable spindle driving member is provided which is driven by an electric motor or like means and is splined to the spindle. With such a machine the spindle rotates continuously as it is retracted or advanced with respect to the work and a maximum amount of torque is always available. As a result drill breakage due to jamming of the drill in the work piece, is a relatively common occurrence.

A general object of the invention is to provide drilling apparatus which will overcome many of the disadvantages of conventional drill presses, and which will tend to minimize drill breakage and make possible better control of the drill during drilling operations.

A further object of the invention is to provide drilling apparatus which will provide for driving torque upon the drill only as the drill is forced against the work.

A further object of the invention is to provide drilling apparatus incorporating an automatic clutch means between the spindle driving member and the spindle, and which clutching means is automatically engaged responsive to urging the drill against the work.

Further objects of the invention will appear from the following description in which the preferred embodiment has been set forth in detail in conjunction with the accompanying drawing.

The drilling apparatus illustrated in the drawing consists generally of a frame 10 (shown only in part), a portion 11 of which forms a spindle supporting head. Concentric sleeves 12 and 13 are slidably supported within the head 11, and extending longitudinally through these sleeves there is a spindle 14. Suitable bearing assemblies 16 and 17 serve to journal spindle 14 to the sleeve 12. The lower end of the spindle carries a conventional chuck 18, which serves to clamp a drill 19 or like tool. It will be evident that vertical movement of the sleeve 12 in the head 11 serves to raise or lower the chuck 18 and the drill 19 held by the same, whereby the drill can be retracted or advanced against the work, and also fed into the work during a drilling operation.

Above the sleeve 12 there is a spindle driving member 21 which in this instance is a sheave adapted to be engaged by a V belt 22. This belt also engages a driving sheave 23, which can be carried by the shaft of an electric motor 24. The sheaves 21 and 23 can be of the multi-step type as illustrated to permit a change in driving speed.

The spindle driving member 21 is journaled to rotate about the axis of the spindle 14, and as will be presently explained it is associated with automatic clutching means. Thus ball bearing assemblies 26 and 27 are shown for journaling the hub 28 of the sheave to the head of the machine frame. As illustrated the upper end of the spindle 14 extends through the hub 28.

The clutching means associated with the sheave 21 serves to effect a drive connection between this sheave and the spindle. In the preferred embodiment illustrated the clutch means consists of two clutching elements, one being a hollow conical surface 29 formed within the sheave, and the other being a male conical clutching member 31. Clutching member 31 is splined to the upper portion of the spindle, whereby the spindle is free to move vertically, while at the same time being driven by the member 31. A thrust bearing assembly 32 forms an operative connection between the clutch member 31 and the upper end of member 13.

The means provided for raising and lowering the spindle and the sleeve 12 consists in this instance of a shaft 33 which is journaled within one side of the sleeve 13. A pinion 34 is keyed to shaft 33 and engages a gear rack 36 formed on one side of the sleeve 12. An operating handle 37 is attached to the exterior end of shaft 33 to facilitate manual turning of the same. It will be evident that when shaft 33 is turned counterclockwise as viewed in the drawing, the engagement between pinion 34 and rack 36 will tend to urge the sleeve 12 downwardly, and the sleeve 13 upwardly. The lower end 38 of the sleeve 13 has abutting engagement with the adjacent portion of the machine frame. It is desirable to provide suitable adjusting means such as a set screw 39, whereby the position of sleeve 13 relative to the frame can be adjusted.

Operation of my drill press can be explained as follows: Assuming that the motor 24 is in operation but that the drill 19 is out of contact with the work, sheave 21 is driven with the motor, but the spindle 14 remains idle because of the lack of pressure between the clutch elements. To commence a drilling operation the operator turns the handle 37 to lower the drill 19 into contact with the work. Immediately upon contact of the drill with the work there is an upward thrust component upon the drill and spindle 14, and assuming that some force is being applied to the handle 37, the sleeve 13 applies upward thrust to the clutch member 31, to force this member into frictional driving engagement with the conical clutch surface 29. Rotation of the drill therefore commences concomitant with application of downward thrust upon the drill. As greater thrust is applied against the work by manual force upon the handle 37, it is possible for the driving sheave 21 to apply greater turning torque to the drill. Thus the torque can be fully controlled and adjusted to be adequate for normal operation of the drill.

If the drill should become jammed due to some abnormal condition, the operator immediately releases downward pressure upon the handle 37, and as a result the clutch is automatically disengaged and the spindle 14 stopped. The operator now has an opportunity to remove the drill from the work or to alleviate the jammed condition, after which the drilling operation can be resumed by again applying pressure to the handle 37. In normal operation of the machine the motor 24 can remain in continuous operation, throughout a series of drilling operations. However the spindle will not operate except when and while the drill is being pressed against the work.

If it is desired to eliminate the automatic clutch feature, screw 39 can be adjusted to provide continuous pressure between the clutch elements.

My drill press has many advantages over conventional drilling apparatus. It is possible to carry out drilling operations with full control over the torque applied to the drill, and with a minimum of drill breakage.

It will be evident that my machine can be incorporated in a number of different embodiments. For example it can be used with spindles extending horizontally or at various angles, as well as to vertical spindle machines. Also while the machine as illustrated makes use of manual feed means, the invention can be incorporated in a machine in which the feed is automatic or semi-automatic. In other words in place of the manual handle 37 the shaft 33 can be operated from some suitable automatic or semi-automatic means, such as a hydraulic operator, cycling cam, etc.

I claim:

1. A drill press, a frame, a vertical spindle carried by the frame, the lower end of the spindle being adapted for attachment to a drill, a pair of sleeves concentric with the spindle and through which the spindle extends, the outer sleeve being movably carried by the frame and the inner sleeve being movable relative to the outer sleeve, means forming a journal bearing between the inner sleeve and the spindle, a rotatable spindle driving member aligned with the spindle, friction clutching means adapted to clutch said member to the spindle for driving the latter, manual means for effecting relative longitudinal movement between the outer and inner sleeves, and means forming a thrust connection between the outer sleeve and one of the elements of said clutch, the thrust of the drill against the work being transmitted from the spindle through both said sleeves to effect engagement of said clutching means.

2. In a drill press, a frame, a pair of concentric sleeves carried by the frame and disposed on a vertical axis, the outer sleeve being movable in a vertical direction relative to the frame and the inner sleeve being movable in a vertical direction through the outer sleeve, a spindle extending axially through the inner sleeve and journaled to the same, a drill chuck attached to the lower end of the spindle, a horizontal shaft journaled to the outer sleeve, a pinion carried by said shaft, handle means for turning the shaft, a gear rack formed on the inner sleeve and engaged by said pinion, a spindle driving member aligned with the spindle axis, clutching means operative between said spindle driving member and said spindle, said clutching means including a pair of clutch elements adapted to be frictionally engaged, one element being attached to the spindle driving member and the other clutch element being splined to the spindle, and a thrust bearing between the upper end of the outer sleeve and said last named clutch element, the cooperation of the parts being such that when said handle is turned to force a drill against a work piece, the thrust of such engagement is transmitted through both said sleeves to force said clutch elements into driving engagement.

BURTIS W. BENBOW.

REFERENCES CITED

The following references are of record in the file of this patent:

UNITED STATES PATENTS

| Number | Name | Date |
|--------|------|------|
| 505,516 | French | Sept. 26, 1893 |
| 542,695 | Stoner et al. | July 16, 1895 |